US010422074B2

(12) United States Patent
Sprenger et al.

(10) Patent No.: US 10,422,074 B2
(45) Date of Patent: *Sep. 24, 2019

(54) CARBON FIBRE FIBRE-SIZING CONTAINING NANOPARTICLES

(71) Applicant: Evonik Degussa GmbH, Essen (DE)

(72) Inventors: Stephan Sprenger, Oststeinbek (DE); Matthias Naumann, Hamburg (DE)

(73) Assignee: Evonik Degussa GmbH, Essen (DE)

( * ) Notice: Subject to any disclaimer, the term of this patent is extended or adjusted under 35 U.S.C. 154(b) by 9 days.

This patent is subject to a terminal disclaimer.

(21) Appl. No.: 15/554,367

(22) PCT Filed: Mar. 7, 2016

(86) PCT No.: PCT/EP2016/054732
§ 371 (c)(1),
(2) Date: Aug. 29, 2017

(87) PCT Pub. No.: WO2016/142316
PCT Pub. Date: Sep. 15, 2016

(65) Prior Publication Data
US 2018/0030648 A1   Feb. 1, 2018

(30) Foreign Application Priority Data

Mar. 10, 2015   (EP) .................... 15158364

(51) Int. Cl.
| | |
|---|---|
| *C08K 7/06* | (2006.01) |
| *D06M 11/79* | (2006.01) |
| *C08J 5/06* | (2006.01) |
| *H01B 1/04* | (2006.01) |
| *H01B 1/24* | (2006.01) |
| *D06M 15/55* | (2006.01) |
| *D06M 23/08* | (2006.01) |
| *C08J 5/24* | (2006.01) |
| *C01B 32/00* | (2017.01) |
| *C01B 32/05* | (2017.01) |
| *D01F 9/12* | (2006.01) |
| *D06M 101/40* | (2006.01) |

(52) U.S. Cl.
CPC ............. *D06M 11/79* (2013.01); *C01B 32/00* (2017.08); *C01B 32/05* (2017.08); *C08J 5/06* (2013.01); *C08J 5/24* (2013.01); *C08K 7/06* (2013.01); *D01F 9/12* (2013.01); *D06M 15/55* (2013.01); *D06M 23/08* (2013.01); *H01B 1/04* (2013.01); *H01B 1/24* (2013.01); *D06M 2101/40* (2013.01); *D06M 2200/40* (2013.01)

(58) Field of Classification Search
CPC .. C01B 32/00; C01B 32/05; C08J 5/06; C08J 5/24; C08K 7/06; D01F 9/12; D06M 11/79; D06M 15/55
USPC ........................................................ 523/205
See application file for complete search history.

(56) References Cited

U.S. PATENT DOCUMENTS

| | | | |
|---|---|---|---|
| 7,727,599 B2 | 6/2010 | Doehler et al. | |
| 7,832,983 B2* | 11/2010 | Kruckenberg | B82Y 30/00 415/200 |
| 7,981,501 B2* | 7/2011 | Kwag | B29C 43/003 264/258 |
| 8,247,525 B2 | 8/2012 | Schubert et al. | |
| 8,268,939 B2 | 9/2012 | Ebbrecht et al. | |
| 8,653,214 B2 | 2/2014 | Venzmer et al. | |
| 8,772,423 B2 | 7/2014 | De Gans et al. | |
| 8,921,437 B2 | 12/2014 | Knott et al. | |
| 8,946,311 B2 | 2/2015 | Schiller et al. | |
| 9,102,778 B2 | 8/2015 | Sprenger et al. | |
| 9,175,145 B2 | 11/2015 | Eger et al. | |
| 9,725,538 B2 | 8/2017 | Klostermann et al. | |
| 2009/0149573 A1* | 6/2009 | Venzmer | C08F 283/12 523/201 |
| 2009/0176112 A1 | 7/2009 | Kruckenberg et al. | |
| 2009/0298987 A1* | 12/2009 | Eger | C08L 51/006 524/424 |
| 2011/0001086 A1 | 1/2011 | Kruckenberg et al. | |
| 2015/0133597 A1 | 5/2015 | Eger et al. | |
| 2018/0044233 A1* | 2/2018 | Sprenger | C03C 25/26 |

FOREIGN PATENT DOCUMENTS

| | | |
|---|---|---|
| CN | 101484628 | 7/2009 |
| CN | 104389167 A | 3/2015 |
| CN | 104389175 | 3/2015 |
| EP | 1 634 921 A1 | 3/2006 |
| WO | 2007/130979 A2 | 11/2007 |
| WO | WO 2007/130979 | 11/2007 |

OTHER PUBLICATIONS

International Search Report dated Jul. 19, 2016 in PCT/EP2016/054732 filed Mar. 7, 2016.
U.S. Appl. No. 13/141,754, filed Jun. 23, 2011, US 2011-0257280 A1, Martin Glos et al.
U.S. Appl. No. 12/725,540, filed Mar. 17, 2010, US 2010-0240786 A1, Martin Glos et al.
U.S. Appl. No. 13/322,477, filed Nov. 25, 2011, US 2012-0068110 A1, Frank Schubert et al.
U.S. Appl. No. 13/981,366, filed Jul. 24, 2013, US 2013-0310530 A1, Brajesh Kumar Jha et al.
Chinese Office Action dated May 17, 2019, in corresponding Chinese Patent Application No. 201680014169 filed Mar. 7, 2016 (with English translation).

* cited by examiner

*Primary Examiner* — Hannah J Pak
(74) *Attorney, Agent, or Firm* — Oblon, McClelland, Maier & Neustadt, L.L.P.

(57) ABSTRACT

A carbon fiber material is coated with nanoparticles, where the coating contains from 0.01 to less than 10% by weight of nanoparticles, based on the dry weight of the coated fiber material, and the coating may optionally be involved in further reactions.

20 Claims, No Drawings

CARBON FIBRE FIBRE-SIZING CONTAINING NANOPARTICLES

DESCRIPTION OF THE INVENTION

Lightweight construction is one of the most important technologies for overcoming the challenges of the 21st century. Use of fibre-composite materials is indispensible for lightweight construction. Increasing use of said materials in the transport sector, for example in aircraft construction, in rail vehicle construction, or in automobile construction, in mechanical engineering, or in the construction sector demands that the performance capability of these fibre composites is constantly increased. Rotor blades for wind turbines are being produced with increasing length, and the mechanical stability requirements placed upon these are therefore constantly increasing.

Production of fibre-composite materials, especially for high-performance applications, frequently uses thermoset or thermoplastic polymer matrices. Said polymer matrices are optimized with respect to their performance in the fibre composite. The structure and design of the reinforcement fibres used, short fibres or continuous-filament fibres, and also the textile structures produced therefrom, which may be woven fabrics, knitted fabrics, laid scrims, or preforms, are likewise optimized with respect to the application in the component.

Failure of a fibre composite is primarily dependent on the fibre/polymer matrix interface. Indispensible requirements are good bonding of the fibre to the thermoset or thermoplastic polymer matrix, and also good wetting of the fibre.

There are in principle two possible ways of solving this problem through addition of nanomaterials. Firstly, it is possible to incorporate nanomaterials into the polymer matrix, using relatively large quantities for this purpose; secondly, the fibres could be coated with nanomaterials.

This problem is solved by using a fibre-sizing system (also known as size) during the process for producing the fibre. The functions of the sizing system are firstly protection of the fibre, i.e. not only of the individual filaments but also of the fibre bundle (roving) during the further steps of processing, and also the subsequent bonding of the fibre to the thermoset or thermoplastic polymer matrix. The sizing system can also influence other fibre properties, e.g. antistatic behaviour. The sizing system comprises constituents matched to the type of fibre, e.g. glass fibre or carbon fibre, the fineness of the fibre, and the intended subsequent application, e.g. processing in epoxy resins or in unsaturated polyester resins.

Sprenger (J. Mater. Sci., 44 (2009), pp. 342-5) discloses fibre-composite materials comprising nanoparticles uniformly distributed in the polymer. There is no substantive effect on mechanical properties in comparison with the use of other particles, even with 10% by weight content of silicon dioxide particles in the matrix.

Yang (Mat. Letters 61 (2007), pp. 3601-4) discloses a carbon fibre sizing system with $SiO_2$ nanoparticles and the favourable effect on interlaminar shear strength in accordance with ASTM D2344, but there is no disclosure of any quantitative data allowing calculation of the particle content on the fibres. No improvement of other laminate properties was observed.

The prior art has the disadvantage that relatively large quantities of nanomaterials are used.

It was an object of the present invention to simplify the prior-art process through use of smaller quantities of nano materials.

Surprisingly, it has been found that even small quantities of nanomaterials present in the size lead to exceptional improvement of the mechanical properties of the carbon fibre composite materials.

The present invention provides carbon fibre material coated with nanoparticles, where the coating comprises from 0.01 to less than 10% by weight of nanoparticles, based on the dry weight of the coated carbon fibre material, and where the coating can become involved in further reactions.

Within the scope of the invention, the term nanoparticles means organic or inorganic particles, preferably inorganic particles, more preferably oxidic and/or hydroxidic particles, still more preferably particles of non-mineral origin; it is particularly preferable that the particles comprise oxides and/or hydroxides of aluminium, of titanium, of zinc, of tin, of vanadium, of cerium, of iron, of magnesium or of silicon, and it is more particularly preferable that the particles are $SiO_2$ particles. It is preferable that the $SiO_2$ particles are selected from precipitated silica, colloidal silica, diatomaceous earth (Kieselguhr) and fumed silica, preference being given in particular to colloidal silica.

It is preferable that the $SiO_2$ particles have been hydrophobized by surface treatment. Particular preference is given to the surface-modified particles disclosed in paragraphs 60 to 65 in EP2067811 (US 2009/0149573), and it is more particularly preferable that the $SiO_2$ nanoparticles have been surface-treated with alkyl- or aryalkoxysilanes.

It is more preferable that the inorganic particles have been surface-treated. It is preferable that the surface treatment has been carried out with compounds selected from organosilicon compounds such as trialkylchlorosilane, dialkyldichlorosilane, alkylalkoxysilanes, arylalkoxysilanes, hexamethyldisilazane, (meth-)acryloxypropyltrialkoxysilanes, aminopropyltrialkoxysilanes, polydimethylsiloxanes, polysiloxanes, Si—H-functional polysiloxanes, carboxylic acids, chelating agents and fluoropolymers, and also mixtures of these.

The nanoparticles are preferably of spherical or irregular shape; the nanoparticles are more preferably of spherical shape.

Preference is in particular given to carbon fibre material coated with nanoparticles, where said coating comprises from 0.01 to less than 10% by weight of nanoparticles, based on the dry weight of the coated carbon fibre material, where the coating can become involved in further reactions and the nanoparticles are surface-modified spherical silica nanoparticles.

The average diameter of the nanoparticles is preferably from 1 to 300 nm, more preferably from 1 to 200 nm, still more preferably from 2 to 150 nm, yet more preferably from 3 to 100 nm and with particular preference from 5 to 50 nm.

It is preferable that the diameters of the nanoparticles prior to application to the carbon fibre are determined by means of DLS (dynamic light scattering). The average values from DLS are weight-average values. The diameters of the nanoparticles on the carbon fibre are determined by means of electromicrographs. The average values are then arithmetical averages.

Preference is further given to mixtures of nanoparticles of different type, where the mixtures comprise at least $SiO_2$ particles; these mixtures preferably comprise more than 50% by weight of $SiO_2$ particles, based on the total mass of all of the nanoparticles, and more preferably comprise more than 80% by weight, still more preferably comprise more than 95% by weight and with particular preference comprise more than 99% by weight.

Preference is in particular given to SiO$_2$ nanoparticles with diameter from 5 to 50 nm, the surface of which has been hydrophobically modified, in particular has been hydrophobized with alkylalkoxysilanes and/or arylalkoxysilanes.

Carbon fibre materials are preferably individual filaments, fibre bundles comprising individual filaments, or yarns comprising individual filaments or fibre bundles. It is further preferable that the carbon fibre materials are products such as laid scrims and woven fabrics comprising individual filaments, fibre bundles or yarns. Particular preference is given to laid scrims comprising fibre bundles. Woven fabrics are preferably of linen-weave type. Preferred laid scrims are composed of layers, and these layers may have single-direction (uniaxial) orientation or multidirectional (multiaxial) orientation.

Laid scrims have the advantage that the fibres or fibre bundles of the layers have not been subjected to bending by the braiding procedure. This results in greater capacity to absorb forces.

In particular it is preferable that the carbon fibre materials are laid scrims made of carbon fibres.

The carbon fibre materials are preferably fabricated unfinished products in the form of cleaned materials or already coated, and it is preferable to use cleaned carbon fibre materials. The cleaning method is preferably material-dependent; a preferred cleaning method is heat treatment, particular preference being given to irradiation with the aid of an IR source. It is preferable that the heat treatment takes place under inert gas. It is preferable that the inert gas comprises no oxygen; the quantity of oxygen present in the inert gas is preferably less than 1% by volume, more preferably less than 0.1% by volume, with particular preference less than 50 ppm.

The length of a preferred IR source is 1 m. The carbon fibre material is conducted past the IR source at a distance of from 5 mm to 10 cm, preferably from 1 cm to 3 cm. The irradiation leads to the decomposition of compounds located on the surface of the carbon fibre material. The procedure is optimized in such a way that even after repeated irradiation under identical conditions the mass of a test sample or a plurality of identical test samples does not differ by more than 1% of the measured value.

When the coated carbon fibre material of the invention is coated with the nanomaterials, it preferably takes the form of individual filaments, fibre bundles, woven fabrics or laid scrims; more preferably, fibre bundles are coated with the nanomaterials.

The carbon fibre materials of the invention preferably comprises less than 9% by weight, more preferably less than 8, 7, 6, 5, 4, 3, or 2% by weight, based on the dry weight of the coated fibre, of nanomaterials.

The carbon fibre materials of the invention moreover more preferably comprise from 0.05 to 1.6% by weight, particularly preferably from 0.1 to 1.2% by weight, with particular preference from 0.2 to 1.0% by weight, based on the dry weight of the coated fibre, of nanomaterials.

With particular preference the carbon fibre materials of the invention coated with nanoparticles are fibre bundles that have been coated with spherical SiO$_2$ nanoparticles surface-treated with alkylalkoxysilanes and/or with arylalkoxysilanes in an epoxy resin, where the coated fibre bundles comprise from 0.1 to 2% by weight of nanoparticles, based on the dry weight of the coated fibre bundles, and where the coating can become involved in further reactions.

The further reactions of the coating of the carbon fibre material are reactions which permit chemical bonding to a polymer matrix through crosslinking reactions. The polymer matrix and the carbon fibre materials of the invention, coated with nanoparticles, can form a carbon fibre composite material in which, at the surface of the coating, the coating of the carbon fibre materials can react with the polymer matrix.

It is preferable that these reactions involve ring-opening polymerization of epoxides.

The invention further provides processes for the production of carbon fibre material coated with nanoparticles, where said coating comprises from 0.01 to less than 10% by weight of nanoparticles, based on the dry weight of the coated carbon fibre material, and where the carbon fibre material is brought into contact, by immersion or spraying, or with the aid of a bath, with an aqueous emulsion comprising a nanoparticle-containing film-former, and where the coated carbon fibre material is subsequently dried, where the aqueous emulsion comprises surface-modified spherical silica nanoparticles.

Preference is given to the process of the invention for the production of carbon fibre material coated with nanoparticles, where said coating comprises from 0.01 to less than 10% by weight of nanoparticles, based on the dry weight of the coated carbon fibre material, where the carbon fibre material is brought into contact with a bath, where the bath comprises an aqueous emulsion of a nanoparticle-containing film-former, and where the coated carbon fibre material is subsequently dried.

It is preferable that the carbon fibre material is not immersed directly in the bath, and that instead the nanoparticle-containing film-former is applied to the carbon fibre material by means of a rotating applicator roll. It is preferable that the underside of the applicator roll becomes immersed in the bath and during rotation takes up a certain quantity of film-former in the form of film, and that the carbon fibre material is brought into contact with the nanoparticle-containing film-former on the upper side of the roll. The quantity applied here on the carbon fibre material is dependent on the inherent properties of the aqueous emulsion of the nanoparticle-containing film-former, for example preferably the viscosity, and on the rotational velocity of the roll, the diameter of the roll and the nature of the surface of the roll. It is preferable that the velocities of the roll and of the carbon fibre material are matched to one another in such a way that no sliding friction arises.

It is preferable that the film-former is a reactive, crosslinkable monomer or oligomer, with particular preference an epoxy resin.

More preference is given to the process for the production of carbon fibre material coated with nanoparticles, where said coating comprises from 0.01 to less than 10% by weight of nanoparticles, based on the dry weight of the coated carbon fibre material, and where the carbon fibre material is brought into contact, by immersion or spraying, or with the aid of a bath, with an aqueous emulsion comprising a nanoparticle-containing film-former, and where the coated carbon fibre material is subsequently dried, where the aqueous emulsion comprises surface-modified spherical silica nanoparticles, where the film-former is an epoxy resin.

It is preferable that the aqueous emulsion of the nanoparticle-containing film-former comprises further components, preferably selected from vicosity regulators, preference being given to carboxymethylcellulose and hydroxyethylcellulose, wetting agents and dispersion additives, and emulsifiers.

The solids content of the aqueous emulsion is calculated from the entirety of components except for the water.

It is preferable that the aqueous emulsion comprises from 1 to 50% by weight of nanoparticles, based on the solids content of the emulsion, preferably from 5 to 30% by weight and with particular preference from 10 to 20% by weight.

Particular preference is given to the process for the production of carbon fibre material coated with nanoparticles, where said coating comprises from 0.01 to less than 10% by weight of nanoparticles, based on the dry weight of the coated carbon fibre material, and where the carbon fibre material is brought into contact, by immersion or spraying, or with the aid of a bath, with an aqueous emulsion comprising a nanoparticle-containing film-former, and where the coated carbon fibre material is subsequently dried, where the aqueous emulsion comprises surface-modified spherical silica nanoparticles, where the film-former is an epoxy resin, where the aqueous emulsion comprises from 10 to 20% by weight of nanoparticles based on the solids content of the emulsion.

It is preferable that the drying in the process of the invention is carried out at temperatures above room temperature, preferably from 30 to 95° C., more preferably from 35 to 90° C., still more preferably from 40 to 85° C., yet more preferably from 45 to 80° C., particularly preferably from 50 to 75° C. and with particular preference from 55 to 70° C.

It is preferable that the drying is carried out within from 0.5 to 10 minutes, preferably within from 1 to 3 minutes.

It is preferable that the drying is carried out with hot air in countercurrent.

In particular the drying in the process of the invention is carried out at temperatures of from 55 to 70° C. with hot air in countercurrent within from 1 to 3 min.

The coating procedure and the drying in the process of the invention can be carried out repeatedly.

It is preferable that the carbon fibre material is dried to constant weight at the conclusion of the process of the invention in order to determine the nanoparticle content. Said drying is preferably carried out at 55 to 70° C.; after cooling to room temperature, the material is weighed, and the drying and weighing procedure is repeated until the difference between at least two successive weighings is less than 0.5% of the measured value.

The invention further provides the use of the carbon fibre materials of the invention, coated with nanoparticles, and/or of the products of the process of the invention, for the production of carbon fibre composite materials.

The invention further provides carbon fibre composite materials comprising the carbon fibre material of the invention, coated with nanoparticles, and/or the product of the process of the invention, in a polymer matrix.

It is preferable that the polymer matrix is a thermoset, preferably epoxy resin, a vinyl ester resin or an unsaturated polyester resin, particularly an epoxy resin.

An advantage of the carbon fibre materials of the invention, coated with nanoparticles, is that the addition of nanoparticles to the fibre-sizing system not only improves the properties of the fibre but also surprisingly moreover improves the properties of carbon fibre composite materials produced therefrom. In particular, there is an improvement in fracture toughness and in fatigue behaviour under cyclic stress. According to the prior art, improvements of this type are found only as a consequence of modification of the entire resin matrix with nanoparticles.

Another advantage here is that the desired effect is brought about even when the quantity of nanomaterials in the coating of carbon fibre materials is exceptionally small, and that an increase in the mass of nanomaterials does not bring about any further improvement of the mechanical properties of carbon fibre composite materials produced therefrom.

Another advantage is that carbon fibre composite materials comprising carbon fibre material with a mass of nanomaterials exceeding the range claimed by the present invention have poorer properties than the carbon fibre composite materials of the invention.

The examples reveal the advantageous use of the carbon fibre materials of the invention.

A particularly important characteristic of a laminate is its fatigue behaviour. This is studied by using a cyclic three-point bending test. This test subjects a sheet of the carbon fibre composite material to load cycles and measures the energy recovered. This result is used to calculate the energy which is dissipated within the laminate and which leads to damage to the laminate, and finally to fracture. The greater the energy dissipated, the smaller the number of cycles that a laminate withstands, i.e. the shorter the lifetime of the laminate.

The coating of carbon fibre materials with these small quantities of nanomaterials represents an improvement over the prior art and simplifies the coating process.

The subject-matter provided by the invention is illustratively described hereinbelow without any intention to limit the invention to these illustrative embodiments. Where ranges, general formulae or compound classes are specified hereinbelow, these are intended to include not only said ranges or groups of compounds that are explicitly mentioned but also all sub-ranges and sub-groups of compounds which can be obtained by extracting individual values (ranges) or compounds. When documents are cited for the purposes of the present description, the entire content thereof, and in particular the factual content relevant to the context in which the document has been cited, is intended to be part of the disclosure of the present invention. Unless otherwise stated, percentages are percentages by weight. Unless otherwise stated, average values reported hereinbelow are weight averages. Unless otherwise stated, when parameters stated hereinbelow have been determined by measurement, the measurements were carried out at a temperature of 25° C. and at a pressure of 101 325 Pa.

EXAMPLES

Materials:
Nanopox® F 400 (trade mark of Evonik Hanse GmbH, Germany) comprises 40% by weight of $SiO_2$ particles of diameter 20 nm (number-average), and was first emulsified in water. Said emulsion was then diluted to the values stated in the Examples.

Neoxil 965 (DSM Composite Resins) was always used in the form of a 6% by weight emulsion in water, based on the entire emulsion.

Desizing of the Fibre Materials:
A carbon fibre bundle was conducted past an IR source at a distance of 2 cm. The velocity was optimized in such a way that the original size system was entirely removed. This was determined by way of the loss of mass.

General Coating Process:
A rotating applicator roll is used to apply the film-former to the fibre material. The underside of the applicator roll becomes immersed in the sizing bath and during rotation takes up a certain quantity of film-former, and the fibre material is brought into contact with the film-former on the upper side of the roll. It is preferable that the velocity of the roll and of the fibre material are matched to one another in such a way that no velocity difference arises.

Example 1

Sizing on Desized Carbon Fibres

T700SC-24000 (Toray Carbon Fibres, France) carbon fibre material was desized by IR irradiation and, after cooling to room temperature, weighed. The fibre bundles were then directly coated. The immersion bath comprised an aqueous emulsion of epoxy resin film-formers and, where appropriate, $SiO_2$ nanoparticles. After immersion, the fibres were dried at 60° C. to constant weight. The quantity of the size system applied was then checked by difference weighing.

The applied mass of each of the size systems was 1.8% by weight (based on the total mass of the fibres after cleaning+ coating applied). Three size systems were studied.

The compositions of the immersion baths were as follows:
1. Neoxil 965 only
2. Mixture of 50% by weight of Neoxil 965 and 50% by weight of Nanopox F 400 (in the form of 2% by weight aqueous emulsion of $SiO_2$)
3. Mixture of 50% by weight of Neoxil 965 and 50% by weight of Nanopox F 400 (in the form of 4% by weight aqueous emulsion of $SiO_2$)
4. Mixture of 50% by weight of Neoxil 965 and 50% by weight of Nanopox F 400 (in the form of 24% by weight aqueous emulsion of $SiO_2$)

The calculations for the coatings after weighing to constant weight are therefore:

System 1: 1.8% by weight of Neoxil 965, not according to the invention

System 2: 1.35% by weight of Neoxil 965 and 0.45% by weight of Nanopox F 400, corresponding to 0.18% by weight of $SiO_2$ System 3: 1.08% by weight of Neoxil 965 and 0.72% by weight of Nanopox F 400, corresponding to 0.288% by weight of $SiO_2$ System 4: 0.36% by weight of Neoxil 965 and 1.44% by weight of Nanopox F 400, corresponding to 0.576% by weight of $SiO_2$ Test samples were now wound in the form of DU materials using the coated fibre materials. These were then impregnated with the epoxy resin/hardener mixture and hardened in accordance with the manufacturer's instructions. The epoxy resin used was Infusion Resin MGS®RIM 135 (trade mark of Hexion, Germany) in combination with the hardener RIMH 137 (Hexion). The selected impregnation process was VARI (Vacuum Assisted Resin Infusion). The mechanical properties of the resultant laminates were tested.

Fracture toughness ($G_{Ic}$) was measured in accordance with DIN EN ISO 15024:2001 with the following parameters: 65 mm "delamination strength".

Transverse tensile strength was determined in accordance with DIN EN ISO 527-5: 2008.

Dissipated energy was determined in accordance with DIN EN ISO 13003:2003 in the three-point bending test after 3000 cycles.

Interlaminar shear strength (ILSS) was determined in accordance with ASTM-D 2344.

Flexural modulus was determined in accordance with DIN EN ISO 14125:1998.

TABLE 1

Maechanical properties of the laminates according to Example 1

| Test | System 1 | System 2 | System 3 | System 4 |
|---|---|---|---|---|
| ILLS in fibre direction | 37 mPa | 59 mPa | 53 mPa | 50 mPa |
| Fracture toughness $G_{Ic}$ | 310 J/m² | 535 J/m² | 685 J/m² | n. d. |
| Flexural modulus | 103,816 mPa | 89,775 mPa | 90,589 mPa | 86,674 mPa |

The results show the advantageous use of the carbon fibre materials of the invention.

The invention claimed is:

1. A carbon fibre material coated with a coating comprising nanoparticles in a film-former, wherein said coating comprises from 0.01 to less than 10% by weight of nanoparticles, based on the dry weight of the coated carbon fibre material, wherein the coating may optionally be involved in a further reaction and wherein the nanoparticles are surface-modified spherical silica nanoparticles.

2. The carbon fibre material coated with a coating comprising nanoparticles in a film-former according to claim 1, wherein the film-former of the coating comprises a resin having crosslinkable epoxy groups.

3. The carbon fibre material coated with a coating comprising nanoparticles in a film-former according to claim 1, wherein the film-former of the coating comprises an epoxy resin.

4. A process for the production of a carbon fibre material coated with nanoparticles, said process comprising:
contacting the carbon fibre material, by immersing the carbon fibre material in a bath of an aqueous emulsion coating, or spraying the carbon fibre material with an aqueous emulsion coating, wherein the aqueous emulsion coating comprises a nanoparticle-containing film-former, to form a coated carbon fibre material, and
subsequently drying the coated carbon fibre material, where the nanoparticles of the nanoparticle-containing film-former of the aqueous emulsion comprise surface-modified spherical silica nanoparticles, and
wherein said coating comprises from 0.01 to less than 10% by weight of nanoparticles, based on the dry weight of the coated carbon fibre material.

5. The process according to claim 4, wherein the carbon fibre material is not directly immersed in the bath.

6. The process according to claim 4, wherein the aqueous emulsion comprises from 1 to 50% by weight of nanoparticles, based on the solids content of the emulsion.

7. A carbon fibre composite material, comprising:
the carbon fibre material coated with a coating comprising nanoparticles in a film-former according to claim 1.

8. The carbon fibre composite material according to claim 7, wherein the film-former is a polymer matrix.

9. The carbon fibre composite material according to claim 8, wherein the polymer matrix is a thermoset polymer matrix.

10. The carbon fibre composite material according to claim 9, wherein the thermoset polymer matrix is an epoxy resin.

11. The process according to claim 4, wherein the nanoparticle-containing film-former is applied to the carbon fibre material by means of a rotating applicator roll.

12. The carbon fibre material coated with a coating comprising nanoparticles in a film-former according to claim 1, wherein the surface-modified spherical silica nanoparticles are spherical silica nanoparticles which are surface-treated with compounds selected from the group consisting of alkyl- and arylalkysilanes.

13. The carbon fibre material coated with a coating comprising nanoparticles in a film-former according to claim 1, wherein the surface-modified spherical silica nanoparticles are spherical silica nanoparticles which are surface-treated with compounds selected from the group consisting of trialkylchlorosilane, dialkyldichlorosilane, alkylalkoxysilanes, arylalkoxysilanes, hexamethyldisilanes, (meth)acryloxypropyl-trialkoxysilanes, aminopropyltrialkoxysilanes, polydimethylsiloxanes, polysiloxanes, Si—H-functional polysiloxanes, carboxylic acids, chelating agents, fluoropolymers, and mixtures thereof.

14. The carbon fibre material coated with a coating comprising nanoparticles in a film-former according to claim 1, wherein the nanoparticles have an average diameter of 1 to 300 nm.

15. The carbon fibre material coated with a coating comprising nanoparticles in a film-former according to claim 1, wherein the nanoparticles are mixtures of different types of nanoparticles comprising more than 50% by weight of silica nanoparticles.

16. The carbon fibre material coated with a coating comprising nanoparticles in a film-former according to claim 1, wherein the carbon fibre materials are selected from the group consisting of individual filaments, fibre bundles comprising individual filaments, and yarns comprising individual filaments or fiber bundles.

17. The carbon fibre material coated with a coating comprising nanoparticles in a film-former according to claim 1, wherein said coating comprises from 0.05 to 1.6% by weight of said nanoparticles, based on the dry weight of the coated carbon fibre material.

18. The process for the production of a carbon fibre material coated with nanoparticles according to claim 4, wherein the drying is carried out at a temperature from 30 to 95° C.

19. The process for the production of a carbon fibre material coated with nanoparticles according to claim 4, wherein the drying is carried out at a temperature from 50 to 75° C. for 0.5 to 10 minutes.

20. The process for the production of a carbon fibre material coated with nanoparticles according to claim 4, wherein the drying is carried out at a temperature from 55 to 70° C. for 1 to 3 minutes.

* * * * *